(12) United States Patent
Gee et al.

(10) Patent No.: US 7,800,763 B1
(45) Date of Patent: Sep. 21, 2010

(54) HIGH PRECISION MEASUREMENT OF THE FREE SPECTRAL RANGE OF AN ETALON

(75) Inventors: Sangyoun Gee, Orlando, FL (US); Peter Delfyett, Geneva, FL (US); Sarper Ozharar, Orlando, FL (US); Franklyn Quinlan, Winter Park, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 674 days.

(21) Appl. No.: 11/762,404

(22) Filed: Jun. 13, 2007

Related U.S. Application Data (60) Provisional application No. 60/813,313, filed on Jun. 13, 2006.

(51) Int. Cl.
*G01B 9/02* (2006.01)

(52) U.S. Cl. .................................... 356/519

(58) Field of Classification Search ............... 356/454, 356/480, 506, 519; 372/32
See application file for complete search history.

(56) References Cited

U.S. PATENT DOCUMENTS

| 6,186,937 | B1 * | 2/2001 | Ackerman et al. | 356/506 |
| 7,136,169 | B2 * | 11/2006 | Sandstrom | 356/519 |
| 7,554,667 | B1 * | 6/2009 | Kampe | 356/454 |

OTHER PUBLICATIONS

Uehara et al, Accurate measurement of ultralow loss in a high-finesse Fabry-Perot interferometer using the frequency response functions, Applied Physics B, vol. 61, 1995, pp. 9-15.*

(Continued)

*Primary Examiner*—Samuel A Turner
(74) *Attorney, Agent, or Firm*—Brian S. Steinberger; Phyllis K. Wood; Law Officesof Brian S. Steinberger, P.A.

(57) ABSTRACT

Methods, systems, apparatus and devices for using a modified PDH technique to measure the FSR of an etalon with one part per $10^4$ precision. An embodiment of the method for measuring the free spectral range of an etalon can include generating a laser light from a laser source, generating a RF source signal, RF modulating the laser light with the RF source signal to produce an RF modulated laser signal, coupling the RF modulated laser signal through a circulator to the etalon, coupling a reflected RF signal from the etalon through the circulator to photo detector, converting the reflected RF signal to an electrical signal at the photo detector, amplifying the electrical signal, mixing the amplified electrical signal with a RF delayed source signal, linearly scanning a frequency of the RF source signal, and monitoring a peak-to-peak mixer voltage $V_{mixer}$ during the linear scanning of the RF source signal frequency to detect a peak-to-peak minimum voltage when the RF modulation frequency is tuned approximately to a free spectral range of the etalon, the result having a precision greater than one part per $10^4$ without the use of a high resolution optical spectrum analyzer or a tunable laser. This method is especially useful for etalons with small FSR (less than 10 GHz) because this method does not require a high resolution OSA or tuneable laser. As the ITU grid for DWDM becomes denser, this method will have a larger impact on the FSR measurement of etalons.

8 Claims, 5 Drawing Sheets

OTHER PUBLICATIONS

Manson, High procision free spectral range measurement using a phase modulated laser beam, Review of Scientific Instruments, vol. 70, No. 10, Oct. 1999, pp. 3834-3839.*

Bram et al, Phase-sensitive reflection technique for characterization of a Fabry Perot interferometer, Applied Optics, vol. 39, No. 21, Jul. 2000, pp. 3638-3643.*

Xiang et al, Experimental study of the free spectral range(FSR) in FPI with a small plate gap, Optics Express, vol. 11, No. 23, Nov. 2003, pp. 3147-3152.*

P.D. Knight, et al., "High-resolution measurement of the free spectral range of an etalon" Proceedings of SPIE, vol. 4772, (2002) pp. 114-117.

H. Jager, et al., "Optical measurement of the free spectral range and spacing of plane and confocal Fabry-Perot interferometers" Optical Engineering, vol. 29, No. 1, Jan. 1990, pp. 42-46.

R. Williamson, et al., "Precise fee spectral range measurement of telecom etalon" Proceedings of SPIE, vol. 5180, (2003), pp. 274-282.

* cited by examiner

HIGH PRECISION MEASUREMENT OF THE FREE SPECTRAL RANGE OF AN ETALON

This application claims the benefit of priority to U.S. Provisional Patent Application No. 60/813,313 filed on Jun. 13, 2006

Funded by Defense Advanced Research Projects Agency (DARPA) ADSP, Grant Number DAAD 1702C0097.

FIELD OF THE INVENTION

This invention relates to free spectral range measurement and, in particular, to methods, systems, apparatus and devices for measurement to determine the free spectral range of an etalon utilizing a modified Pound-Drever-Hall technique with better than one part per $10^4$ precision.

BACKGROUND AND PRIOR ART

Fabry-Perot etalons have been used for many years to select and stabilize the wavelength of tunable diode lasers for dense wavelength division multiplexed (DWDM) systems. In order to match the transmission channels of an etalon with the International Telecommunication Union grid, precise measurement of the free spectral range (FSR) of the etalon is critical. Most reported works are based on the mapping out of the transmission spectrum as the injected laser wavelength is tuned as described in H. Jager, M. Musso, C. Neureiter, and L. Windholz, "Optical measurement of the free spectral range and spacing of plane and confocal Fabry-Perot interferometers," Optical Engineering, 29, 1, pp 42-46, January (1990); P. D. Kinght, A. Cruz-Cabrera, and B. C. Bergner, "High-resolution measurement of the free spectral range of an etalon," Proceedings of SPIE, 4772, pp 114-117, (2002); and R. Williamson, and C. Terpstra, "Precise free spectral range measurement of telecom etalon," Proceedings of SPIE, 5180, pp 274-282, (2003).

These prior art techniques are quite simple and fairly precise allowing up to 4 part per million of error for a 100 GHz free spectral range etalon. However, the precision is fundamentally limited by the resolution of the optical spectrum analyzer or tunable laser used, making it very difficult to apply to etalons with a FSR smaller than 10 GHz. The Pound-Drever-Hall (PDH) technique has been well known to stabilize the laser wavelength using an etalon as a frequency reference. The present invention uses a simple modification of PDH to measure the FSR of etalons with precision easily exceeding one part of $10^4$ regardless of the size of FSR.

SUMMARY OF THE INVENTION

A primary objective of the invention is to provide new methods, systems, apparatus and devices for precision measurement of telecommunications etalons.

A secondary objective of the invention is to provide new methods, systems, apparatus and devices for high resolution measurement of the free spectral range of an etalon without the use of a high resolution optical spectrum analyzer.

A third objective of the invention is to provide new methods, systems, apparatus and devices for measuring the free spectral range of an etalon with better than one part per $10^4$ precision.

A first preferred embodiment of the present invention provides a method for measuring the free spectral range of an etalon. The method includes the steps of generating a laser light from a laser source, generating a RF source signal and RF modulating the laser light with the RF source signal to produce an RF modulated laser signal. The RF modulated laser signal is coupling through a circulator to the etalon, which reflects a reflected RF signal that is coupled through the circulator to photo detector. At the photo detector, the reflected RF signal is converted to an electrical signal. The electrical signal is amplified and the amplified electrical signal is mixed with a RF delayed source signal. While the frequency of the RF source signal is linearly scanned, a mixer peak-to-peak mixer voltage $V_{mixer}$ is monitored to detect a peak-to-peak minimum voltage when the RF modulation frequency is tuned approximately to a free spectral range of the etalon, the result having a precision greater than one part per $10^4$ Without the use of a high resolution optical spectrum analyzer or a tunable laser.

In an embodiment, the step of generating a laser light comprises the step of generating a laser light having a line width that is narrower than a FSR/finesse of the etalon. In another embodiment the mixing step includes the step of setting a phase difference $\Delta\phi$ between a mixer LO input and RF input at approximately zero to improve sensitivity and the monitoring step includes the step of monitoring peaks of peak-to-peak value of $V_{mixer}$ to detect a sign change as the RF modulation frequency passes the free spectral range of the etalon.

A second preferred embodiment of the invention provides a system for measuring a free spectral range of an etalon. The system includes a laser source for producing a laser light, a radio frequency source for generating an RF source signal, a phase modulator for receiving the RF source signal and the laser light and modulating the laser light, a circulator for receiving the modulated laser light and transferring the received laser light to the etalon that reflects a reflected signal back to the circulator. A photo detector coupled with the circulator receives the reflected signal and converts the reflected signal to an electrical signal and an RF amplifier connected to the photo detector receives and amplifies the electrical signal. An RF delay device receives and delays the RF source signal which is mixed at a mixer having a LO input connected with the RF delay and RF input connected with RF amplifier with the amplified electrical signal. A measuring device monitors a peak-to-peak voltage $V_{mixer}$ at the mixer as the frequency of the RF source signal is linearly scanned to measure the free spectral range of the etalon under test.

In an embodiment, the laser source has a line width that is narrower than FSR/finesse of the etalon. In another embodiment, a phase difference between the mixer LO and RF input set at approximately zero to improve sensitivity. The free spectral range measurement of the etalon using the modified Pound-Drever-Hall is particularly useful for etalons having a free spectral range of less than approximately 10 GHz.

Further objects and advantages of this invention will be apparent from the following detailed description of preferred embodiments which are illustrated schematically in the accompanying drawings.

DESCRIPTION OF THE PREFERRED EMBODIMENTS

Before explaining the disclosed embodiments of the present invention in detail it is to be understood that the invention is not limited in its application to the details of the particular arrangements shown since the invention is capable of other embodiments. Also, the terminology used herein is for the purpose of description and not of limitation.

The following is a list of the reference numbers used in the drawings and the detailed specification to identify components:

| | | | |
|---|---|---|---|
| 10 | tunable laser | 40 | RE reference source |
| 20 | phase modulator | 50 | photo detector |
| 30 | optical circulator | 60 | mixer |
| 70 | RF low pass filter | 240 | RF source |
| 75 | scope | 250 | photo detector |
| 80 | RF amplifier | 260 | mixer |
| 90 | RF delay | 270 | RF low pass filter |
| 100 | Prior art circuit | 275 | measuring device |
| 200 | FSR circuit | 280 | RF amplifier |
| 210 | laser source | 290 | RF delay |
| 220 | phase modulator | 300 | etalon |
| 230 | circulator | | |

Figure 1:
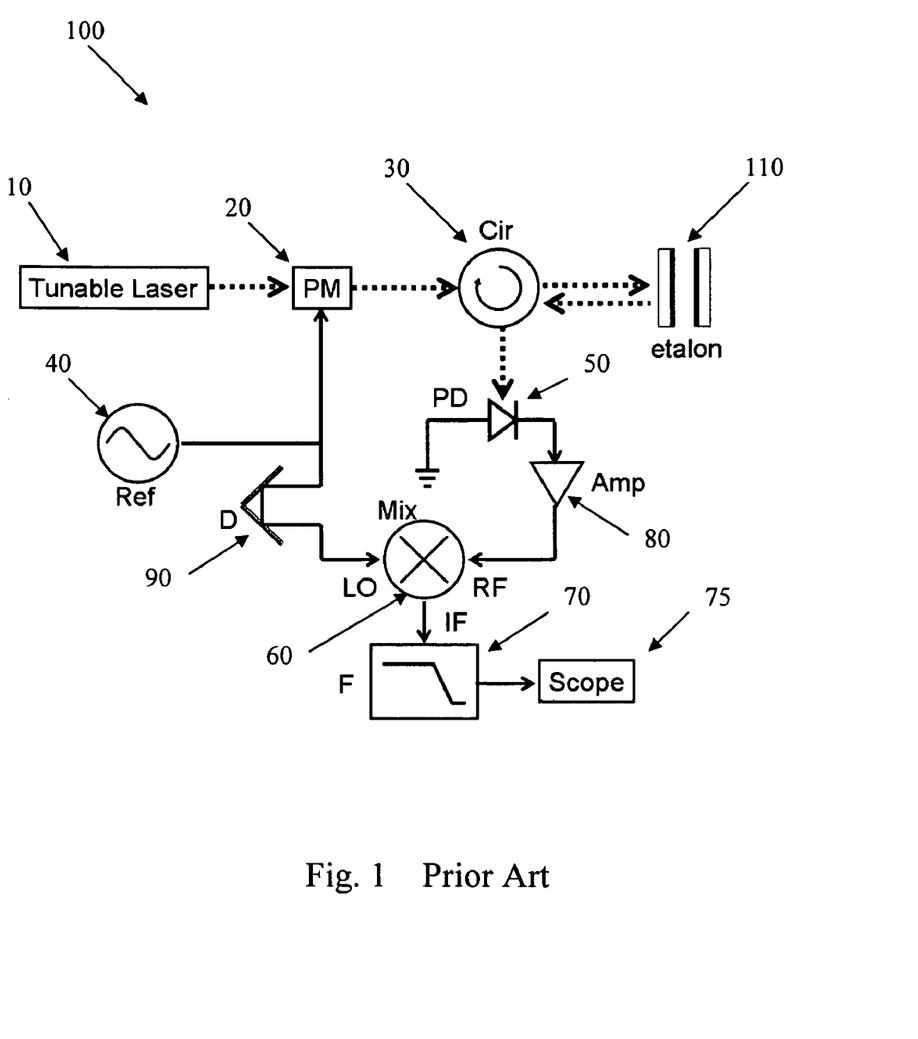
FIG. 1 is a schematic diagram of a circuit configuration of the prior art measurement technique using the Pound-Drever-Hall technique.

The easiest way to explain modified Pound-Drever-Hall technique is starting with the prior art Pound-Drever-Hall technique using the circuit configuration 100 shown in FIG. 1. The prior art circuit includes a tunable laser 10, a phase modulator (PM) 20, an optical circulator 30, a radio frequency source 40, a photo detector 50, an RF mixer 60, RF low pass filter 70, RF amplifier 80, and an RF delay 90. A scope 75 is connected with the RF low pass filter for monitoring the mixer output.

As shown, the circulator 30 is fed phase modulated laser signal and transfers the signals to the etalon 100 which reflects a signal back to the circulator 30. The circulator transfers the etalon reflected signal to the photo detector 50 where the pulses of light are converted to bursts of electricity. The amplifier 80 amplifies the electrical pulses and the amplified pluses are fed into the mixer 60. The RF source 40 also feeds an RF signal to the phase modulator 20 and a delayed RF source signal is fed into the mixer 60 from the RF delay 90. The mixed output voltage signal is fed into the low pass filter 70 which is connected with a scope 75 such as a high resolution optical spectrum analyzer for measurement of the free spectral range of the etalon under test.

Figure 2A:
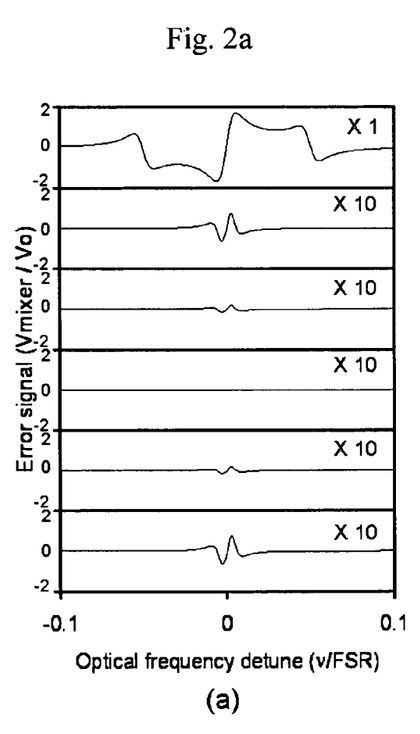
FIG. 2a shows waveforms for simulation of PDH error signals for f/FSR of 0.05, 0.998, 0.999, 1, 1.001, and 1.002 from top to bottom for $\Delta\phi=\pi/2$.
Figure 2B:
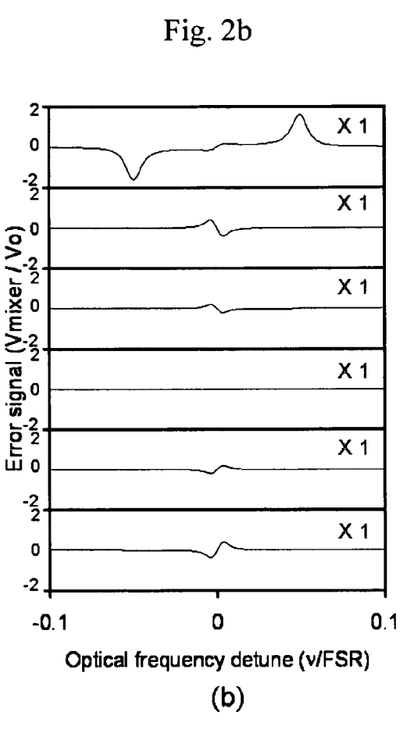
FIG. 2b shows waveforms for simulation of PDH error signals for f/FSR of 0.05, 0.998, 0.999, 1, 1.001, and 1.002 from top to bottom for $\Delta\phi=0$.

The mixer output voltage signal for optical frequency v is, $$V_{Mixer} = V_o \cdot Re[(F(v) \cdot F^*(v+f) - F^*(v) \cdot F^*(v) \cdot F(v-f)) \cdot e^{i \cdot \Delta \phi}]$$

where $V_o = I_o \beta \eta MGR/2$, $I_o$ is the injected optical power, $\beta$ is the modulation strength, $\eta$ is the photo detector efficiency, M is the mixer conversion gain, G is the amplifier gain, R is the impedance (which is approximately 50Ω in this example), $\Delta\phi$ is the phase difference between the mixer LO and RF input, and f is the modulation frequency. The etalon reflectivity F(v) is given as:

$$F(v) = \frac{r \cdot (\exp(i \cdot 2\pi \cdot v / FSR) - 1)}{1 - r^2 \cdot \exp(i \cdot 2\pi \cdot v / FSR)}$$

where r is the facet reflectivity of the etalon. A few examples of $V_{mixer}$ are shown in FIGS. 2a and 2b for an etalon with finesse of approximately 100. In a conventional PDH configuration, the modulation frequency f is arbitrarily selected to be the same order of magnitude as the FSR/finesse of the etalon and $\Delta\phi$ is set at π/2. $V_{mixer}$ is nearly a linear function of optical frequency v near the integer multiples of FSR and is used as a monitor of the optical frequency deviation as shown in FIG. 2a.

There are three primary differences between the Free Spectral Range (FSR) measurement method of the present invention and the prior art Pound-Denver Hall (PDH) technique. First, the signal voltage $V_{mixer}$ at the mixer is measured as the laser frequency is linearly scanned and the peak-to-peak value of $V_{mixer}$ is monitored. Second, the RF modulation frequency f is tuned around the Free Spectral Range of the etalon under test searching for the peak-to-peak minimum $V_{mixer}$ signal. Third, unlike the prior art PDH approach, the phase difference $\Delta\phi$ between the mixer LO and RF input is set at zero instead of π/2. As FIGS. 2a and 2b show, setting $\Delta\phi$ is at zero results in $V_{mixer}$ signal an order of magnitude larger for given optical frequency detuning in comparison to the of $\Delta\phi$ equal to π/2, providing improved sensitivity.

Figure 5:
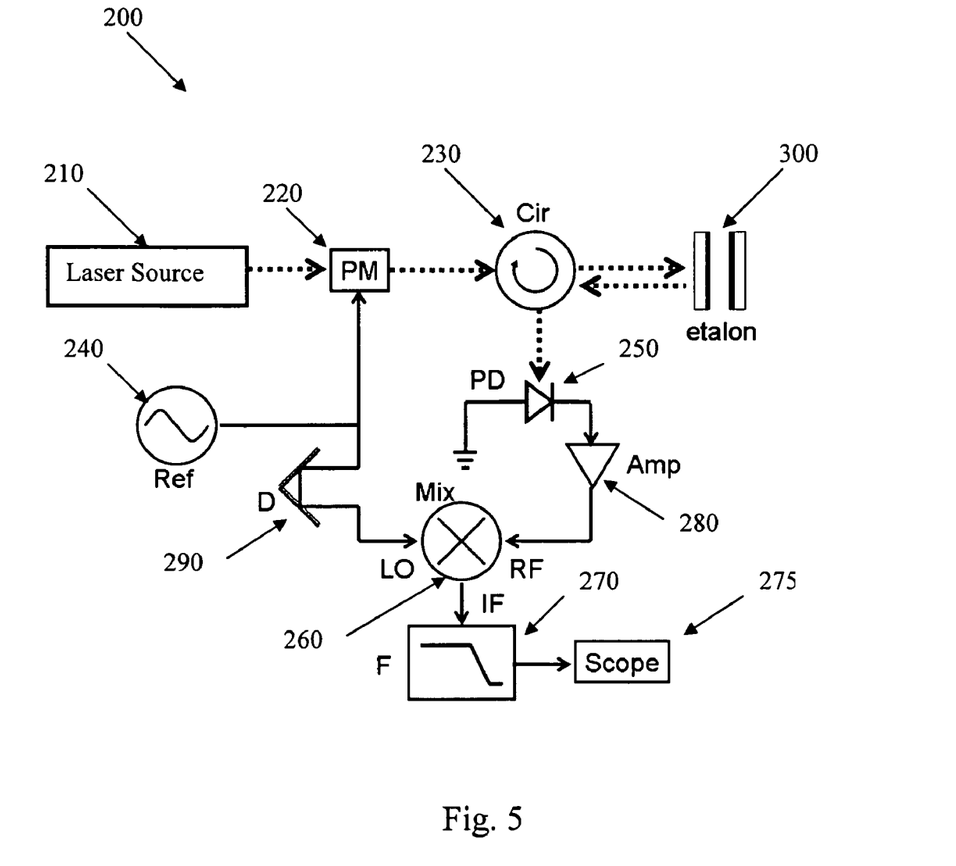
FIG. 5 is a schematic diagram of the system for measuring the free spectral range of an etalon according to the present invention.

FIG. 5 is a schematic diagram of the system for measuring the free spectral range of an etalon according to the present invention. As shown, the circulator 230 is fed a phase modulated laser signal from the phase modulator 220 and transfers the modulated signals to the etalon 300 which reflects a reflected signal back to the circulator 230. The circulator transfers the etalon reflected signal to the photo detector 250 where the pulses of light are converted to bursts of electricity. The amplifier 80 amplifies the electrical pulses and the amplified signal fed into the RF input of the mixer 260. The RF source 240 feeds the RF signal to the phase modulator 220 and a delayed RF signal is fed into the LO input of the mixer 260 from the RF delay 290. A RF low pass filter 270 is connected to the IF output of the mixer to receive the mixed signal. In the preferred embodiment, the phase difference $\Delta\phi$ between the mixer LO input and RF input is set to approximately zero. The mixed output voltage signal is fed into the RF low pass filter 270 which is connected with a measuring device 275 for monitoring the mixer 260 peak-to-peak $V_{mixer}$ signal for detecting the free spectral range of the etalon under test.

The preferred embodiment of the present invention does not require use of a high resolution optical spectrum analyzer or tunable laser for determining the free spectral range of the etalon. Since only the amplitude of the signal $V_{mixer}$ at the mixer 260 is of interest, it is not necessary to calibrate the tunable laser source 210 which eliminates the need for an optical frequency standard.

The measurement systems and methods of the present invention are particularly useful for etalons with small FSR where a typical optical spectrum analyzer or tunable laser can not resolve transmission peaks of etalons. The only requirement for the laser source 210 is that the line width should be narrower than FSR/finesse, which is easy to satisfy. Another benefit of setting $\Delta\phi$ equal to zero is that peaks of $V_{mixer}$ change sign as the RF tuning frequency f passes the FSR, making it easier to find where they cross the zero value.

Figure 3:
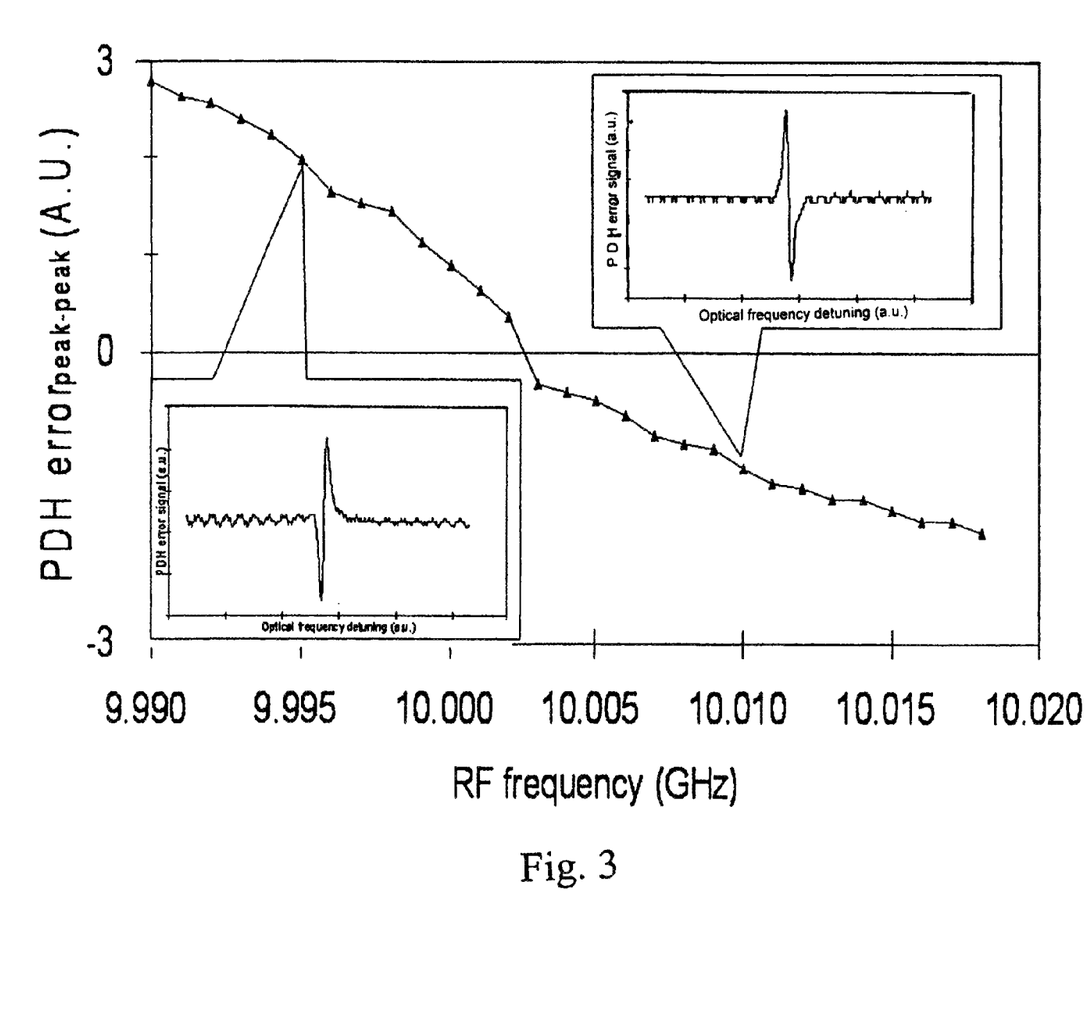
FIG. 3 is a graph showing the PDH error signal peak-to-peak difference verses RF modulation frequency. The insets are measured PDH error signals for two sample points indicated by the call out symbols.

An experiment was conducted and the measurement results for a commercial (Micron optics, Inc.) fiberized etalon with an FSR of 10 GHz and finesse of 100 is shown in FIG. 3. The difference between two peaks of $V_{mixer}$ is plotted as the RF modulation frequency f was varied with 1 MHz steps. The zero crossing is clearly between 10.002 and 10.003 GHz, indicating a precision better than one part per $10^4$. The precision of the method of the present invention is limited by the electric signal to noise ratio. As the insets of FIG. 3 show, there is a modulation of the background signal coming from crosstalk with other electronics, which reduces the signal to noise ratio.

It is interesting to note that the $V_{mixer}$ signal shape is distorted by the asymmetric laser line shape or dispersion from etalon materials or coatings. Additional experimental simulation showed that the asymmetric line shape affects the relative heights of the $V_{mixer}$ curve peaks whereas the dispersion from the etalon affects the horizontal direction (the axis of optical frequency detuning) of the curve. Nonetheless, the zero crossing of $V_{mixer}$ when the f is equal to the FSR is not affected and shows that the method according to the present invention is valid. Unlike the prior art PDH measurement techniques, the novel systems and methods measure the property of the etalon within a very narrow spectral range results in very fast measurement and allows measurement of non-uniformity in the spectral domain.

Figure 4:
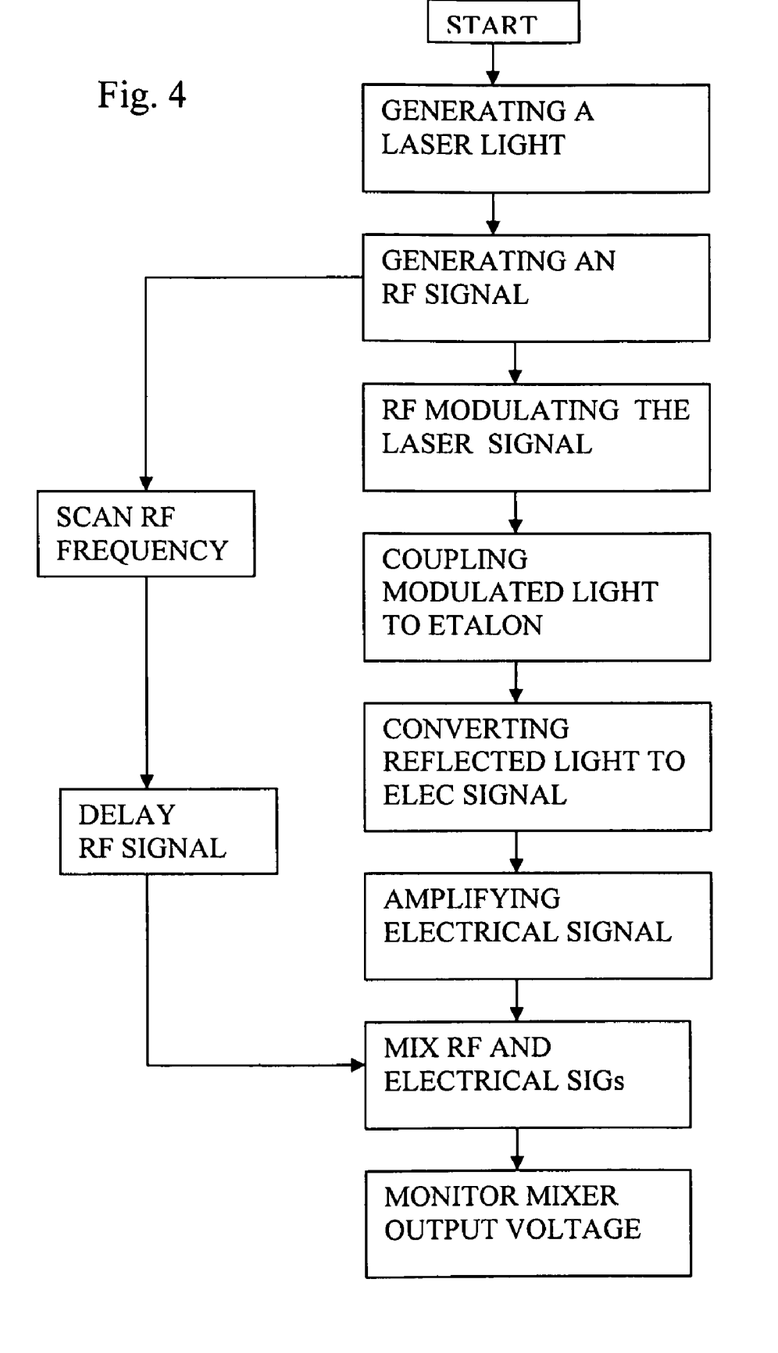
FIG. 4 is a process flow diagram showing the steps for measuring the free spectral range.

FIG. 4 is a process flow diagram showing the steps for measuring the free spectral range.

In summary, the present invention provides methods, systems, apparatus and devices to measure the free spectral range of an etalon with one part per $10^4$ precision. This method is especially useful for etalons with free spectral range of less than approximately 10 GHz since the novel method does not require a high resolution OSA or tuneable laser. As the International Telecommunication Union grid for dense wavelength division wavelength (DWDM) becomes denser, the method of the present invention provides a larger impact on the FSR measurement of etalons.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method for measuring the free spectral range of an etalon comprising the step of:
   generating a laser light from a laser source;
   generating a RF source signal;
   RF modulating the laser light with the RF source signal to produce an RF modulated laser signal;
   coupling the RF modulated laser signal through a circulator to the etalon;
   coupling a reflected RF signal from the etalon through the circulator to a detector;
   converting the reflected RF signal to an electrical signal at the photo detector;
   amplifying the electrical signal;
   mixing the amplified electrical signal with a RF delayed source signal;
   linearly scanning a frequency of the RF source signal; and
   monitoring a peak-to-peak mixer voltage $V_{mixer}$ during the linear scanning of the RF source signal frequency to detect a peak-to-peak minimum voltage when the RF modulation frequency is tuned approximately to a free spectral range of the etalon, the result having a precision greater than one part per $10^4$ without the use of a high resolution optical spectrum analyzer or a tunable laser.

2. The method of claim 1, wherein the step of generating a laser light comprises the step of:
   generating a laser light having a line width that is narrower than a FSR/finesse of the etalon.

3. The method of claim 1, wherein the mixing step includes the step of:
   setting a phase difference $\Delta\phi$ between a mixer LO input and RF input at approximately zero to improve sensitivity.

4. The method of step 3, wherein the monitoring step includes the step of:
   monitoring peaks of peak-to-peak value of $V_{mixer}$ to detect a sign change as the RF modulation frequency passes the free spectral range of the etalon.

5. A system for measuring a free spectral range of an etalon comprising:
   a laser source for producing a laser light;
   a RF source for generating an RF source signal;
   a phase modulator for receiving the RF source signal and the laser light and RF modulating the laser light;
   a circulator for receiving the modulated laser light and transfer the received laser light to an etalon under test, the etalon reflecting a signal back to the circulator;
   a photo detector coupled with the circulator for receiving the reflected signal from the circulator and converting the reflected signal to an electrical signal;
   an RF amplifier connected with the photo detector for receiving and amplifying the electrical signal;
   an RF delay device for receiving and delaying the RF signal;
   a mixer having a LO input connected with the RF delay and RF input connected with RF amplifier for receiving and mixing the amplified electrical signal and the delayed RF signal; and
   a measuring device for monitoring a peak-to-peak voltage $V_{mixer}$ at the mixer as the RF tuning frequency is linearly scanned to measure the free spectral range of the etalon under test.

6. The system of claim 5, wherein the laser source has a line width that is narrower than FSR/finesse of the etalon.

7. The system of claim 5, wherein a phase difference between the mixer LO and RF input set at approximately zero to improve sensitivity.

8. A system for measuring a free spectral range of an etalon consisting of:
   a laser source for producing a laser light having a line width that is narrower than FSR/finesse of the etalon;
   a RF source for generating an RF source signal;
   a phase modulator connected with the laser source and the RF source for receiving the RF source signal and the laser light and RF modulating the laser light;
   a circulator coupled with the phase modulator and the etalon for receiving the RF modulated laser light and transferring the RF modulated laser light to the etalon, the etalon reflecting a reflected signal back to the circulator;
   a photo detector coupled with the circulator for receiving the reflected signal from the circulator and converting the reflected signal to an electrical signal;
   an RF amplifier connected with the photo detector for receiving and amplifying the electrical signal;
   an RF delay device connected to the RF source for receiving and delaying the RF signal;

a mixer having a LO input connected with the RF delay and RF input connected with RF amplifier for receiving and mixing the amplified electrical signal and the delayed RF signal, the phase difference between the mixer LO and RF input set at approximately zero; and a measuring device connect to a IF output of the mixer for monitoring a peak-to-peak voltage $V_{mixer}$ at the mixer as the RF tuning frequency is linearly scanned to measure the free spectral range of the etalon under test.

* * * * *